United States Patent Office 2,987,912
Patented June 13, 1961

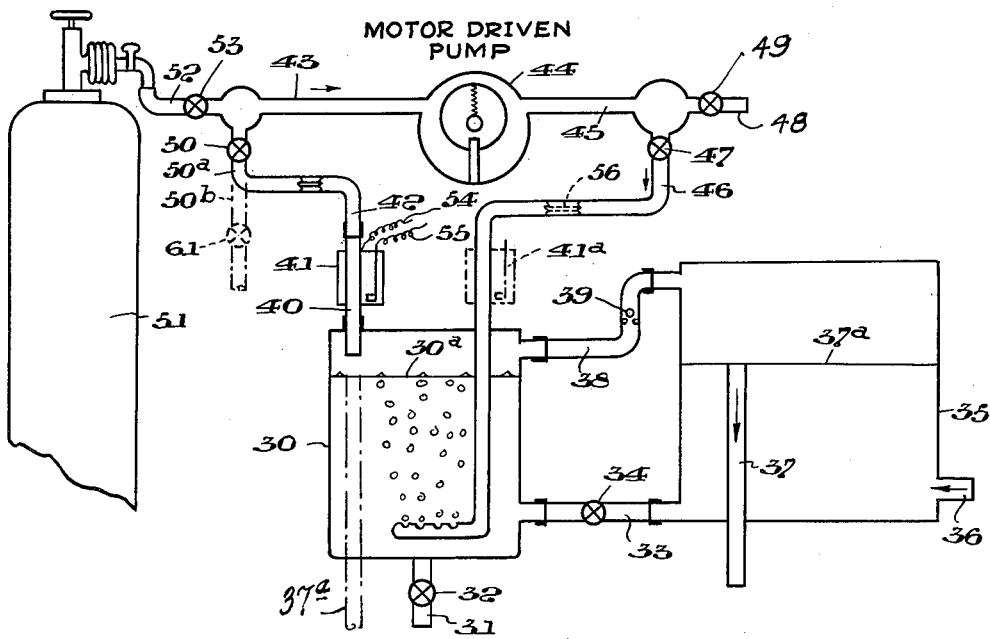

2,987,912
METHOD AND APPARATUS FOR MEASUREMENT OF GAS DISSOLVED IN A LIQUID
Moses G. Jacobson, Penn Township, Pa., assignor to Mine Safety Appliances Company, Pittsburgh, Pa., a corporation of Pennsylvania
Filed June 1, 1956, Ser. No. 588,776
7 Claims. (Cl. 73—19)

This invention relates to the determination of the amount of a gas dissolved in a liquid.

Of recent years the measurement of various gases dissolved in liquids has become of increasing importance. For instance, the amount of oxygen dissolved in boiler feed water is of interest because of the possibility of attack of oxygen upon various components of the boiler and its associated elements. Again, a common practice is to treat city water with chlorine but because an excess of chlorine may be potentially hazardous to health, and in any event adversely affects the potability of the water, measurement of its content is important. Likewise, determination and control of the degree of pollution of rivers and streams is considered necessary in many instances and for various purposes, and at present the best method of doing so is considered to be measurement of the amount of oxygen dissolved in the water. Measurement of dissolved oxygen is likewise of real importance in the control of sewage treatment. Apart from the foregoing situations, determination of gases dissolved in liquids is important in various other fields, examples being in process control in the chemical industries, and for determination of the oxygen content of transformer oils; and even in the case of coolants for heat exchangers undesirable gases may be present in them so that it is important to determine when an objectionable amount is present.

Various means have been proposed and used for the foregoing and related purposes but all of them possess characteristics that are undesirable for a variety of reasons. Up to the present time such means have involved determination of the gas of interest directly in the liquid itself, chiefly by chemical or electrochemical methods. Thus, there have been available methods of determining oxygen in water by polarographic analysis or by amperometric titration. Those and related procedures are influenced to a considerable extent by impurities in the water which may necessitate their removal by preliminary chemical treatment, or evaluation by other means to provide correction factors. Even so, in some cases interference by contaminants cannot always be eliminated or compensated for. Where contaminating impurities are present their elimination or evaluation is time consuming and, obviously, objectionable. In particular, the methods mentioned do not lend themselves readily to automatic control, for instance in process operations or chlorination of city water supples. Another disadvantage of such procedures is that they are not readily adapted to measure oxygen or other gases of interest in electrolytes other than water, such as oil or other nonelectrolytes. Furthermore, in general, devices for such procedures are expensive and delicate, and they require skilled attention.

Moreover, although there have been available over the years means, such as the Orsat apparatus, for chemically determining various gases dissolved in liquids, they likewise are open to various disadvantages such as fragility of the apparatus, tediousness, slowness, and the necessity for at least somewhat skilled operating technique.

It is among the primary objects of the present invention to provide a method and an apparatus suitable for the measurement of a specified gas carried in a liquid in a dissolved or suspended state that are simple, efficient, applicable to continuous operation and to control, in which the dissolved gas to be determined is extracted from the liquid for that purpose instead of being determined in the liquid sample itself, and are not subject to the disadvantages of previously available methods and apparatus.

Another object is to provide such a method and apparatus which in at least the majority of applications do not require any pretreatment of the liquid.

Still another object is to provide a method in accordance with either of the foregoing methods in which the determination or dissolved gas is accomplished rapidly and in a minimum of time as compared with prior procedures.

A further object is to provide portable apparatus of the type contemplated by the invention that may be used in the field for rapid and accurate determination of a dissolved gas by unskilled, non-technical personnel.

Yet another object is to provide apparatus in accordance with any of the foregoing objects for automatically and in substantially continuous fashion measuring the concentration of a gas dissolved in a liquid to control the gas concentration in industrial operations, for example, in connection with boiler feed water, chlorination of city water supplies, for chemical process control, and related purposes.

The invention will be described with reference to the accompanying drawings in which:

FIG. 2 is a schematic representation of an embodiment of apparatus in accordance with and for the practice of the method of the invention applicable to automatic and continuous operation.

In accordance with the invention the amount of a gas dissolved in a liquid is determined in a closed system including a sample vessel and means for quantitatively measuring the amount of gas in question, by flushing the system with a neutral gas, circulating in the system the neutral gas with the displaced dissolved gas, and determining the amount of the latter by the means for measuring the amount of it present. Most suitably, the system is likewise subjected to reduced pressure prior to or concurrently with the introduction of the neutral gas. When most efficient and speedy extraction of the dissolved gas is desired, repeated alternate applications of reduced pressure and introduction of neutral gas are used.

In many embodiments of the invention it is unnecessary to extract the entire amount of the gas in question dissolved in the liquid. That is, it suffices to extract only a percentage of the gas present in the liquid whereby the operation requires a minimum of time. To this end, in the operation of a given apparatus provided by the invention the sample of liquid must occupy a predetermined constant volume in the containing vessel, with a free space above the liquid which should be of relatively small volume. The determination may be made by recirculating the neutral gas together with the released dissolved gas from the sample vessel through the measuring means and returning it to the liquid until the measuring means gives a constant indication, or response. Alternatively, if such operation requires an undesirable length of time, the recirculation may be for a fixed period of time, say 1 or 2 minutes, but in this case the ratio of the gas space to the liquid volume in the sample vessel is important and it must be maintained constant. In the latter instance calibration to account for removal of only a portion of the dissolved gas is made easily by operation of the instrument initially with the liquid in question containing a series of known amounts of the particular dissolved gas, and with a measuring means of adequate sensitivity extraction of as little as ten percent of the dissolved gas is sufficient for an adequate determination, and with proper recirculation this can be accomplished in two minutes or less.

Figure 1:
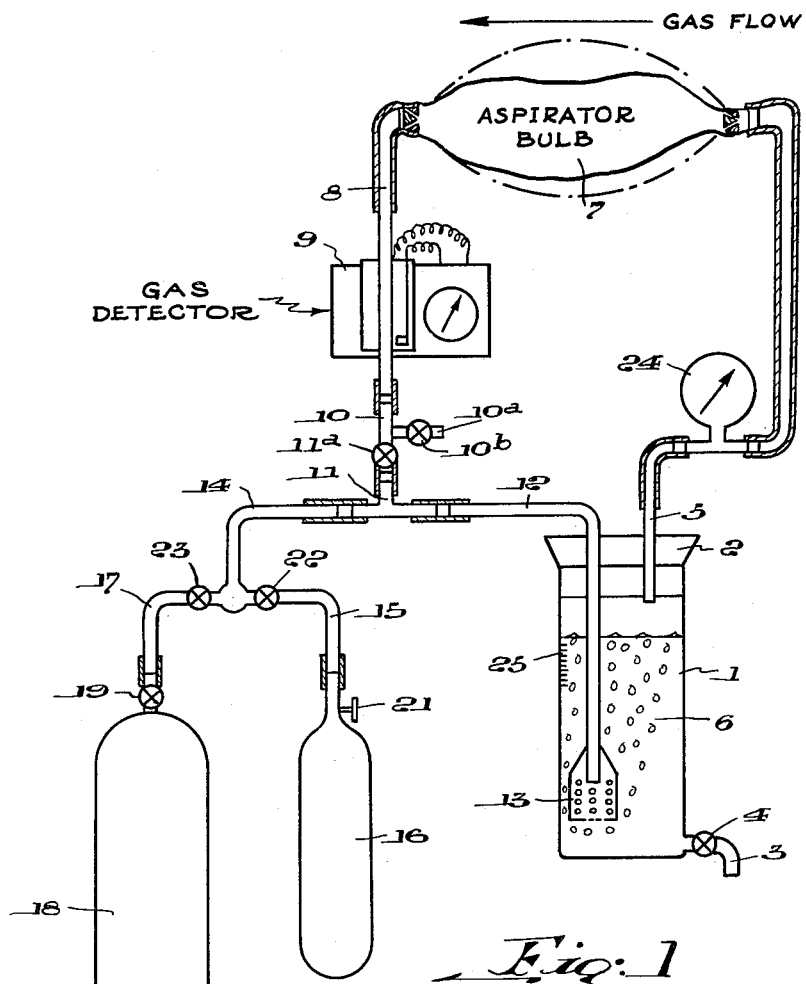
FIG. 1 is a schematic representation of a portable and manually operable apparatus representing one embodiment of the invention.

Having reference now to FIG. 1, the embodiment shown for portable and manual operation comprises a sample vessel 1 provided with a closure member 2, such as a rubber stopper, and a drainpipe 3 provided with a valve 4. Vessel 1 forms part of a closed system that includes a conduit 5 extending through stopper 2 into the gas space above a liquid sample 6. Conduit 5 is connected at its outer end to an aspirator bulb 7 the exhaust end of which is connected by a conduit 8 to means 9 of a type appropriate to determination of the gas in question. The closed system is completed by a conduit 10 leading from the gas measuring means 9 to a three-way connecting tube 11 of T or Y shape, one branch of which is associated with a conduit 12 that extends into the liquid sample adjacent the bottom of the vessel and which most suitably terminates in a bubble skirt 13. Conduit 10 is provided likewise with a side branch 10a and a valve 10b for exhausting the system to the atmosphere. The other branch of 3-way tube 11 is connected to a conduit 14 having a branch 15 connected to a supply of neutral gas 16, and another branch 17 is connected to a liquid sample container 18. The closed system is terminated on the side of conduit 14 by valve 23 in conduit 17 and valve 22 in conduit 15, when both valves are closed. Conduit 14 is made as short as possible, and for high precision the dead space for recirculation can be eliminated by combining valves 22 and 23 into a single three-way valve located at the apex of the three-way connector 11.

In this portable type of apparatus the neutral gas is suitably supplied by a small cartridge similar to those used in home production of carbonated water or liquified gas cigarette lighters whereby a variety of neutral gases may be provided adapted to the particular case, examples being nitrogen, carbon dioxide, butane, propane, and the like.

The term neutral gas as used herein has reference, of course, to a gas that will exert no effect upon the liquid, its dissolved gas to be determined, or the detector means 9.

Container 18 for the liquid sample has a fixed and predetermined volume, for instance 300 milliliters. Suitably it is of the type shown having valves 19 and 20 for filling it with the sample to be tested. The neutral gas container 16 likewise is provided with a valve 21.

A manometer 24 may, if desired, be provided in conduit 5 for indicating negative or positive pressure applied to vessel 1 at various stages of operation.

In the use of the embodiment shown in Fig. 1 containers 16 and 18 are connected, respectively, to conduits 15 and 17 with valves 22 and 23 closed. Valves 19 and 21 are then opened. Assuming that a test has been completed, a valve 4 and 10b are now opened while valves 11a and 23 remain closed. Valve 22 is then opened to permit neutral gas from 16 to pass through conduits 15, 14 and 12 into vessel 2 and force out liquid from 1 through valve 4. When vessel 1 has been emptied valve 4 is closed whereupon, assisted if desired by operation of aspirator bulb 7, the neutral gas flushes through conduit 5, and conduit 8, detector 9, and is exhausted through side arm 10a. Thus the entire system is flushed with the neutral gas. Valve 22 is then closed, and with valves 23 and 11a still closed and valve 10b open, operation of the aspirator bulb is continued for a predetermined brief period or until the pressure in the system is reduced to a predetermined value below atmospheric, which is indicated by manometer 24. After this with valve 10b still open and valves 11a, 22 and 4 closed, valves 20 and 23 are opened to draw, through continued operation of the aspirator 7, the liquid sample from container 18 into sample vessel 1. In case container 18 is not of fixed volume, a scale 25 may be provided on the side of the sample vessel so that a fixed volume of sample may always be introduced into it. At this point valves 10b and 23 are closed, valves 4 and 22 remain closed, and valve 11a is opened.

Operation of the aspirator bulb then draws gas from the space above the liquid in vessel 1 together with the neutral gas in the system and passes it to the detector cell 9 from which it is returned to the liquid adjacent the bottom of the vessel through emergence from the bubble skirt 13. At every squeeze of the aspirator bulb 7, pressure is applied to the gas in conduits 8, 10, 11, 12 and 13 and thereby also to the liquid 6 and the gas dissolved therein. The neutral gas is dispersed into a multitude of bubbles whereby the surface area for taking up dissolved gas is greatly increased. The bubbles enriched with gas extracted from the solution rise to the surface. As bulb 7 expands to its original volume, suction (negative pressure) is applied to the surface of the liquid and the liquid itself, which again is of considerable assistance in the emergence of dissolved gases. It has been established by experiments of the inventor, that this alternate application of pressure and suction to the liquid greatly accelerates the extraction from it of dissolved gases other than the neutral gases used for flushing. This is still further enhanced, by keeping the average pressure during these pressure alternations below the original pressure (in most cases below atmospheric), which is accomplished by the brief evacuation prior to closing of the system mentioned above.

The presence of the dissolved gas is shown by the detector 9. The present invention is not dependent upon any specific detector, a variety of which are available for the determination of a variety of gases. Thus, when testing for dissolved oxygen in an aqueous liquid there is used an instrument which will determine the concentration of oxygen in a mixture of other gases, while for determining chlorine it is necessary to use an instrument that is specific for chlorine in the gas phase. Detectors for oxygen that are not influenced by the presence of large amounts of carbon dioxide are those disclosed in copending applications Serial Nos. 339,438, now Patent No. 2,795,756, and 338,939, now Patent No. 2,861,926, both assigned to the assignee of this application. Among the various other detectors that are applicable to the purposes of the invention are those disclosed in Patent No. 2,156,693 granted on an application filed by the present inventor and which are applicable to the measurement of the concentration of a variety of gases, examples of which are chlorine and hydrogen sulfide.

Figures 1A, 1B:
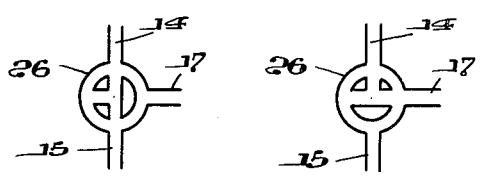
FIGS. 1a and 1b are representations of a modified valve system for use in the embodiment of FIG. 1.

In the preferred embodiment of the apparatus described valves 22 and 23 will be replaced by a single three-way valve, and the same thing is true of valves 10b and 11a. This may be accomplished, for example, as indicated in FIGS. 1a and 1b with reference to valves 22 and 23. Thus, a three-way valve 26 is connected as shown to conduits 14, 15 and 17. In the position shown in FIG. 1a the container of neutral gas is connected to conduit 14, while in the position shown in FIG. 1b the container of sample liquid is connected to conduit 14. Similarly, valves 10b and 11a may be replaced by a single three-way valve, as will be obvious.

FIG. 2 is representative of an apparatus in accordance with the invention that is adapted to automatic operation. It comprises a sample vessel 30 having a drain line 31 controlled by a valve 32. Liquid sample is supplied continuously to vessel 30 through a conduit 33 and a valve 34 that leads from a container 35 into which the liquid under examination flows continuously through a line 36 from a source, not shown. Vessel 35 is provided with over-flow pipe 37 for maintaining constant liquid level 37a. A conduit 38 leads from the top of vessel 30 into the top of vessel 35 and in this line there is provided a one-way relief valve 39 that is adapted to permit liquid to pass from vessel 30 into vessel 35 but which closes when the pressure within vessel 30 is below that in vessel 35. Maintenance of constant level of liquid in vessel 35 acts to maintain the liquid level 30a, or volume, constant in container 30. A conduit 40 passes through the gas tight cover of vessel 30 from the gas space above the liquid and leads to a detector cell 41 whence gas passes through a conduit 42 to another conduit 43 and a pump 44 that passes the gas through a conduit 45 and thence to another conduit 46, provided with a valve 47, for return of the gas to a point adjacent the bottom of vessel 30, most suitably through means for introducing the gas into the liquid in the form of bubbles, as shown. An extension 48 of conduit 45 is provided with a control valve 49 for exhausting the system to the atmosphere. Conduit 42 is provided with a valve 50 in one branch 50a of a T, another branch 50b of which is provided with a valve 61 for flushing the entire apparatus. The third branch of the T constitutes conduit 42. A source of neutral gas 51, such as an ordinary pressure bottle of nitrogen, is connected through a conduit 52 having a valve 53 to pass the neutral gas into the system, as shown.

In the use of the apparatus of FIG. 2 valves 32, 47 and 53 are opened, and valves 34, 49 and 50 are closed. Thus vessel 30 is drained of liquid and the neutral gas flushes out the system. Then with valve 53 remaining open and valve 50 remaining closed, valve 32 is closed, valves 34 and 49 are opened, and valve 47 is closed; at this stage vessel 30 becomes filled with liquid to the fixed level and neutral gas continues to pass through conduits 52 and 43, pump 44 and conduits 45 and 48 to the atmosphere. By flushing through the pump with neutral gas the action of the pump need not be interrupted, as is desirable in continuous operation. At this stage valves 53 and 49 are closed and valves 50 and 47 are opened, while valve 32 remains closed and valve 34 remains open. Under the action of the pump the gas from the space above the liquid in the vessel 30 is drawn by the pump through the detector cell 41, conduits 42 and 43 and thence through conduits 45 and 46 and returned to the liquid in the sample vessel; thus there is circulated in the closed system its content of neutral gas plus the gas extracted from solution in the liquid, and the amount of the latter gas is measured by the detector 41.

In this embodiment, likewise, the detector cell 41 is chosen according to the particular gas to be determined as well as for appropriate sensitivity and rapidity of response. The detector cell may be applied to any suitable means, not shown but of which a variety are available, to make a continuous record, to operate control means, to operate a signal device, or to any combination of such ends, electrical leads 54 and 55 being provided for this purpose, as well known in the art.

A separate evacuation step such as described in connection with FIG. 1 is unnecessary for most purposes when an efficient pump is provided in the embodiment of FIG. 2 of the type that creates considerable pressure at the outlet side and considerable suction at the inlet side. With such a pump vacuum is being supplied inherently during the recirculation step and this action may be enhanced, e.g., in the case of low concentration of dissolved gas, by shifting the point of equality to atmospheric pressure from vessel 30, where it is normally, to a point nearer to valve 47, so that vessel 30 will operate under some pressure that is negative relative to atmospheric pressure. This can be accomplished by inserting an appropriate flow resistance member 56 in conduit 46 between valve 47 and vessel 30; in such case the detector 41 is preferably shifted from the normal position shown to the broken line position 41a.

Although in most instances no treatment of the liquid being tested will be necessary, it will be understood that to avoid clogging of conduits and valves filtration may be necessary where the liquid carries suspended solids, e.g., in testing sewage.

The shifting of the various valves in the several stages of operation as described above will be carried out in an entirely automatic fashion, proper sequence being assured, for example, by a number of angularly shifted cams on a shaft of a time motor and by mechanical or electrical linkages to the respective valves or in other ways, that are known to those conversant with this art. While the operation of the embodiment of FIG. 2 as described above is entirely automatic, it is not a continuous one but rather of a cyclic stepwise nature. By proper means, known to the art, recording and control functions can be suspended during the interruption of continuity caused, e.g., by the step of emptying and flushing tank 30, and refilling it and the step of recirculating neutral gas; thus recording and production of control signals will be confined only to the part of the cycle after the system is closed and several recirculations of the gas have taken place. Inasmuch as the total cycle when an efficient pump is used is only 1–2 minutes long, as compared with indication lags of the order of 10–20 minutes innherent in other strictly continuous systems of such measurements, for all practical purposes—and especially for automatic control—the system of the present invention is more advantageous than any of the known continuous systems.

However, the system of the present invention can be made to approach very closely a continuous system with interruptions of continuity of only a few seconds during a 1 to 2 minute cycle. This is accomplished by multiplexing the entire system of Fig. 2 as described above except for the recording and control equipment in a manner staggered with respect to time; for example, three complete systems as per Fig. 2 are used, and the cams controlling the cyclic operation of the various valves are so arranged on a common shaft of a time motor that in the same time when in system No. 1 the liquid in sample tank 30 is being refilled, in system No. 2 recirculation of neutral gas takes place and in system No. 3 the electric output of the detector is being recorded and eventually alarm or control action initiated. During the next third of the cycle, system No. 3 has its liquid tank refilled, system No. 1 has neutral gas recirculated, and system No. 2 has its detector output transferred to the recorder and the alarm and control function operated from the latter and so forth.

In applications where normally rather large concentrations of the dissolved gas in question are present, the stepwise refilling of liquid tank 30, can be replaced by continuous flow of the liquid: in that case tank 35 is dispensed with, pipe 38 is closed, the liquid enters directly through pipe 33 and leaves through overflow pipe 37a shown in dotted lines. In that case to obtain practically continuous operation only two complete staggered in time systems as for Fig. 2 will be needed. A number of other modifications for special applications are possible, without departing from the scope of the appended claims.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. That method of measuring the amount of a gas dissolved in a liquid comprising the steps of flushing with a neutral gas a vessel in a closed system, including means for measuring the amount of said dissolved gas, then filling said vessel to a predetermined level with said liquid to provide constant ratio of gas to liquid, while retaining neutral gas in the system, and circulating said neutral gas in the system in highly dispersed state through the liquid to extract dissolved gas from the liquid, the change in response of said means after a predetermined length of time of circulation substantially shorter than needed for reaching equilibrium between the gas dissolved in the liquid and the extracted gas indicating the amount of said dissolved gas in the liquid.

2. That method of measuring the amount of a gas dissolved in a liquid comprising the steps of flushing with a neutral gas a vessel in a closed system, including means for measuring the amount of said dissolved gas, then filling said vessel to a predetermined level with said liquid to provide constant ratio of gas to liquid, said level being such that a relatively small gas space remains above the liquid, and circulating said neutral gas under negative pressure and in highly dispersed state through the liquid to extract dissolved gas from the liquid for a period of time substantially shorter than needed for reaching equilibrium between the dissolved gas and the extracted gas, the change in response of said means indicating the amount of said dissolved gas in the liquid.

3. A method according to claim 2, said dissolved gas being oxygen.

4. A method according to claim 2, said dissolved gas being chlorine.

5. A method according to claim 2, said circulating being continued until the indication of said means becomes substantially constant.

6. Apparatus for measuring the amount of a gas dissolved in a liquid comprising a closed sample vessel provided with means for introducing and removing liquid to be tested, a gas circulating system including a conduit from free space above said sample in said vessel, means operatively connected to said conduit for measuring the amount of said dissolved gas present in gas passed through said conduit, a conduit from said measuring means for returning the circulating gas to the liquid sample adjacent the bottom of the container, a side conduit connected to one of said conduits for exhausting gas to the atmosphere, gas pumping means connected to one of said conduits for circulating gas from said vessel through said system, a conduit connected to said system for passing a neutral gas through it and said vessel, and valve means mounted in said conduit.

7. That method of measuring the amount of a gas dissolved in a liquid comprising the steps of flushing with a neutral gas a vessel in a closed system including means for measuring the concentration of said dissolved gas in a gas mixture and a pump adapted to generate substantial pressure at its outlet and substantial suction at its inlet, then filling said vessel to a predetermined level with said liquid to provide constant ratio of gas to liquid while retaining neutral gas in the system, and circulating said neutral gas in highly dispersed form through said liquid and through the system with alternate application of pressure and suction to the liquid and dissolved gas to extract dissolved gas from the liquid, the increase in response of said means after a predetermined length of time substantially shorter than needed for reaching equilibrium between dissolved gas and the extracted gas indicating the amount of dissolved gas in the liquid.

References Cited in the file of this patent

UNITED STATES PATENTS

| 2,270,768 | Polin et al. | Jan. 20, 1942 |
| 2,514,690 | Bliss et al. | July 11, 1950 |
| 2,861,450 | Ransley | Nov. 25, 1958 |

FOREIGN PATENTS

| 600,238 | Germany | July 17, 1934 |

OTHER REFERENCES

Gas Analysis by Measurement of Thermal Conductivity by H. A. Dynes, 1933, pp. 298 to 301, Cambridge University Press.